(12) United States Patent
Takahashi

(10) Patent No.: US 9,195,380 B2
(45) Date of Patent: Nov. 24, 2015

(54) ENVIRONMENT RISK ANALYSIS SYSTEM AND METHOD OF ANALYZING ENVIRONMENT RISK

(75) Inventor: Gen Takahashi, Tokyo (JP)

(73) Assignee: NEC Corporation, Tokyo (JP)

(*) Notice: Subject to any disclaimer, the term of this patent is extended or adjusted under 35 U.S.C. 154(b) by 697 days.

(21) Appl. No.: 13/484,175

(22) Filed: May 30, 2012

(65) Prior Publication Data

US 2012/0310548 A1    Dec. 6, 2012

(30) Foreign Application Priority Data

May 31, 2011  (JP) ................. 2011-121649

(51) Int. Cl.
| | |
|---|---|
| *G01N 31/00* | (2006.01) |
| *G06F 3/0484* | (2013.01) |
| *G06F 11/00* | (2006.01) |
| *G06F 9/455* | (2006.01) |

(52) U.S. Cl.
CPC ........ *G06F 3/04842* (2013.01); *G06F 9/45533* (2013.01)

(58) Field of Classification Search
CPC .......................... G06F 3/04842; G06F 9/45533
USPC .......................................................... 702/24
See application file for complete search history.

(56) References Cited

U.S. PATENT DOCUMENTS

| | | | | |
|---|---|---|---|---|
| 2002/0082806 | A1* | 6/2002 | Kaub ............................ | 702/182 |
| 2004/0039517 | A1* | 2/2004 | Biesinger et al. ............. | 701/117 |

FOREIGN PATENT DOCUMENTS

| | | |
|---|---|---|
| JP | 2004-508567 A | 3/2004 |
| JP | 2004-185399 A | 7/2004 |
| JP | 2008-269361 A | 11/2008 |
| JP | 2009-295001 A | 12/2009 |
| WO | WO 02/21479 A1 | 3/2002 |

OTHER PUBLICATIONS

Japanese Office Action dated Dec. 12, 2014 with a partial English translation.

* cited by examiner

*Primary Examiner* — Phuong Huynh
(74) *Attorney, Agent, or Firm* — McGinn IP Law Group, PLLC

(57) ABSTRACT

An environment risk analysis system includes: a probe terminal configured to acquire environment data including an atmosphere density; an environment analysis client configured to receive threshold data for analysis of an environment risk, specify an analysis-target area in geographic information, output the threshold data and data of the specified analysis-target area, receive an analysis result of the environment risk of the specified analysis-target area, and display data based on the analysis result in layers on the geographic information; and an environment analysis server configured to analyze the environment risk of the specified analysis-target area based on the environment data, the threshold data and the data of the specified analysis-target area, to output the analysis result. The environment analysis server calculates an estimation of a degree of an environmental influence based on the environment data, and calculates an estimation of an exposure rate of the environmental influence.

10 Claims, 15 Drawing Sheets

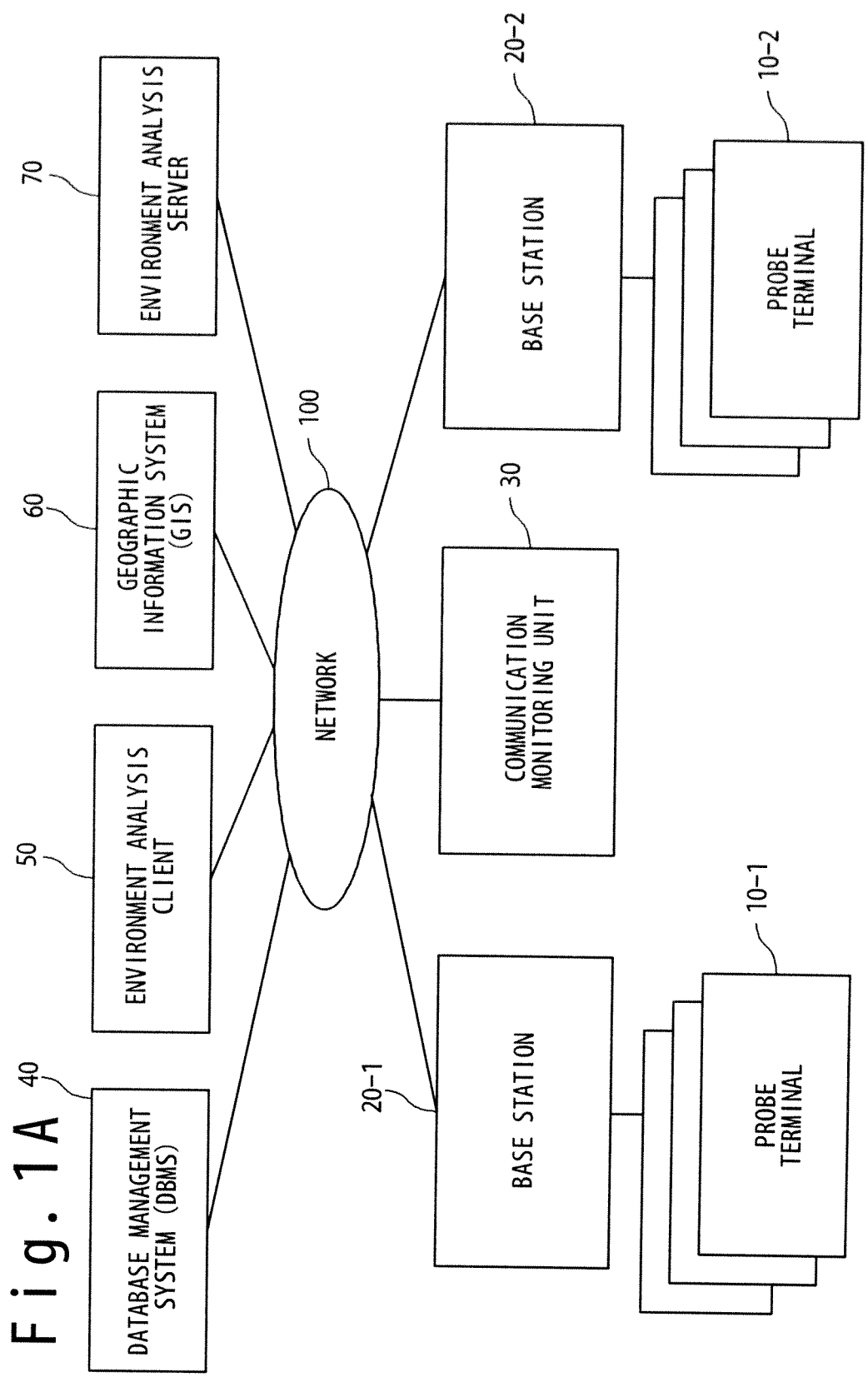

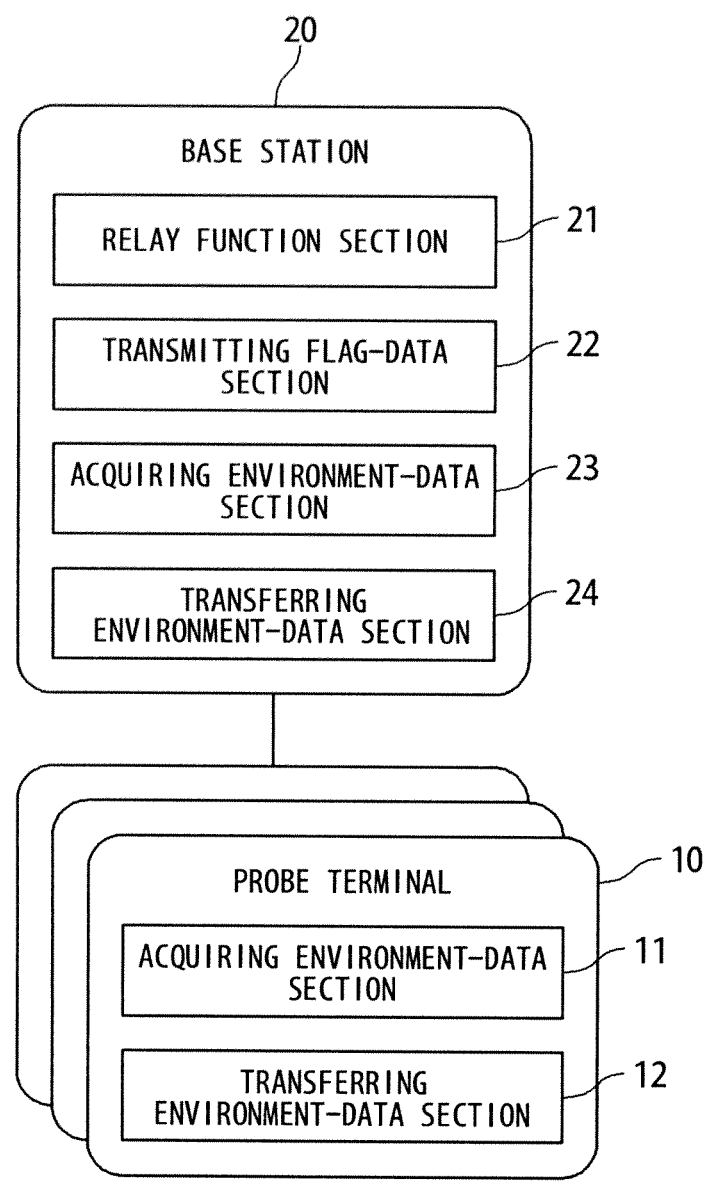

Fig. 10

| TIME | BASE STATION NAME | POSITION $G_i$ | ACCESS COUNT $A_i$ | HANDOVER $H_i$ |
|---|---|---|---|---|
| 9:50 | Site1 | 8 | 500 | 80 |
| 9:50 | Site1 | 14 | 1200 | 372 |
| 9:50 | Site1 | 15 | 300 | 800 |
| 9:50 | Site1 | 19 | 287 | 700 |
| 9:50 | Site1 | 20 | 46 | 200 |
| 9:50 | Site1 | 21 | 125 | 100 |
| 9:50 | Site1 | 26 | 33 | 58 |
| 9:50 | Site1 | 27 | 840 | 100 |
| 10:00 | Site2 | 9 | ... | ... |
| 10:00 | Site2 | 10 | ... | ... |
| 10:00 | Site2 | 11 | ... | ... |
| 10:00 | Site2 | 12 | ... | ... |
| 10:00 | Site2 | 15 | ... | ... |
| 10:00 | Site2 | 16 | ... | ... |
| 10:00 | Site2 | 17 | ... | ... |
| 11:00 | Site3 | 1 | ... | ... |
| 11:00 | Site3 | 2 | ... | ... |
| 11:00 | Site3 | 3 | ... | ... |
| 11:00 | Site3 | 4 | ... | ... |
| 11:00 | Site3 | 5 | ... | ... |
| 11:00 | Site3 | 9 | ... | ... |

ENVIRONMENT RISK ANALYSIS SYSTEM AND METHOD OF ANALYZING ENVIRONMENT RISK

CROSS REFERENCE

This Application claims a priority on convention based on Japanese Patent Application No. 2011-121649. The disclosure thereof is incorporated herein by reference.

TECHNICAL FIELD

The present invention is related to an environment risk analysis system, and especially, to an environment risk analysis system using a network communication system.

BACKGROUND ART

As an analysis system for environmental measure, an automatic telemetry system is coming to a practical use stage by means of the communication infrastructures such as WiMAX (Worldwide Interoperability for Microwave Access) (IEEE 802.16a) and LTE (Long Term Evolution) (Super 3G).

Also, various analysis systems for environmental measure such as a transportation system and a sensor system are proposed.

However, it has not been considered the precise analysis for dynamically changed population, by use of the communication infrastructure, and both of the benefit and the sacrifice for the environmental improvement using the communication infrastructure.

Also, in the conventional technology, the benefit owing to improvement effects by the application of the environment technique and the sacrifice due to deteriorated environment have not been considered at a same time, although the amount of power consumption on a communication terminal which carries out network communication such as mobile communication is related to a technique of the environmental improvement and a technique taken care of environment.

For example, variously applied analysis for environmental measures to systems such as the transportation system and the sensor system are disclosed in Patent Literature 1 (JP 2004-508567A).

However, in the analysis system applied to the transportation system, only a population on a vehicle is considered, and it is not considered the precise analysis for dynamically changed population in addition to both of the benefit and the sacrifice for the environmental improvement by using the communication infrastructure.

Therefore, actually, considering a priority of the environmental improvement activity, there is a problem in the grasping the dynamically changed population.

CITED LIST

[Patent Literature 1] JP 2004-508567A

SUMMARY OF THE INVENTION

One feature of the present invention is to provide an environment risk analysis system which carries out a risk analysis from the acquired environment data by utilizing a function of detecting user traffic conditions in a network communication, to support an environmental measure.

An environment risk analysis system includes: a probe terminal configured to acquire environment data including an atmosphere density; an environment analysis client configured to receive threshold data for analysis of an environment risk, specify an analysis-target area in geographic information, output the threshold data and data of the specified analysis-target area, receive an analysis result of the environment risk of the specified analysis-target area, and display data based on the analysis result in layers on the geographic information; and an environment analysis server configured to analyze the environment risk of the specified analysis-target area based on the environment data, the threshold data and the data of the specified analysis-target area, to output the analysis result. The environment analysis server predicts a degree of an environmental influence based on the environment data, calculates an exposure rate of the environmental influence, determines a relation between the environmental influence and a consumed power amount, and analyzes a feature of an area environment.

An environment analysis server includes: means for calculating an exposure rate of a specified analysis-target area based on data of subscriber accommodation; means for predicting an environment risk of the specified analysis-target area based on a product of the exposure rate and an environment influence degree which is based on an atmosphere density; and means for determining a relation of the environment influence degree and the consumed power amount.

A method of analyzing an environment risk, includes: acquiring environment data including an atmosphere density by a probe terminal; by an environment analysis client, inputting threshold data used to analyze an environment risk, specifying an analysis-target area on geographic information, and outputting threshold data and data of the specified analysis-target area; by an environment analysis server, estimating an environment influence degree of the specified analysis-target area based on the environment data, the threshold data and the data of the specified analysis-target area, estimating an exposure rate of the environment influence degree, calculating a relation of the environment influence degree and a consumed power amount, and analyzing a feature of area environment to output as an analysis result; and by the environment analysis client, receiving the analysis result of the environment risk of the specified analysis-target area and displaying data which is based on the analysis result, on geographic information in layers.

A non-transitory computer-readable storage medium in which a program code is stored to attain a method which includes: calculating an exposure rate of a specified analysis-target area based on data of subscriber accommodation; estimating an environment risk of the specified analysis-target area based on a product of the exposure rate and an environment influence degree which is based on the atmosphere density; and determining a relation of the environment influence degree and a consumed power amount.

The benefit and the sacrifice for environmental influence and the consumed power amount can be considered, and the environmental influence and the risk can be analyzed while grasping the population dynamic change by using traffic measurement data in the network communication.

BRIEF DESCRIPTION OF DRAWINGS

FIG. 1A is a diagram showing a configuration example of an environment risk analysis system according to the present invention;

FIG. 1B is a diagram showing a configuration example of a probe terminal and a base station according to the present invention;

FIG. 10 is a diagram showing data of subscriber accommodation according to the present invention.

DESCRIPTION OF EXEMPLARY EMBODIMENTS

Exemplary Embodiments

Figure 1C:
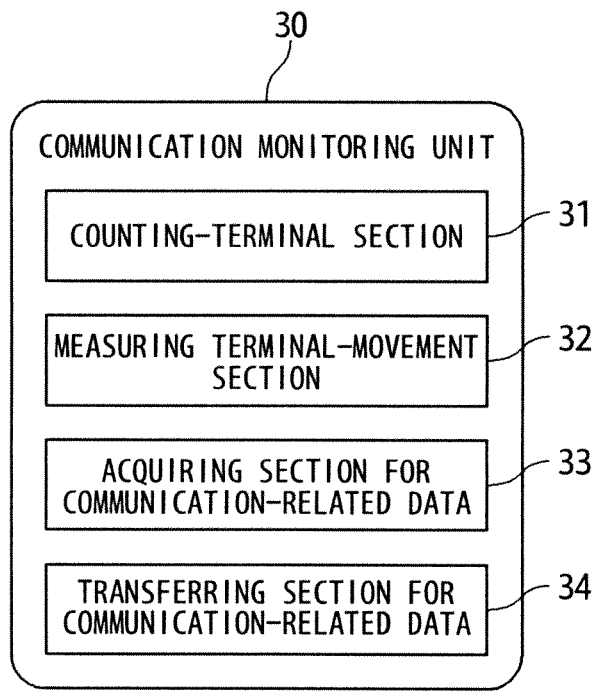
FIG. 1C is a diagram showing a configuration example of a communication monitoring unit according to the present invention.

Hereinafter, exemplary embodiments of the present invention will be described with reference to the attached drawings (System Outline)

The outline of the system configuration of an environment risk analysis system according to the present invention is shown in FIG. 1A.

Referring to FIG. 1A, the environment risk analysis system according to the present invention is provided with terminals such as probe terminals 10 (10-$t$, $t$=1 to X: X is optional), base stations 20 (20-$s$, $s$=1 to Y: Y is optional), a communication monitoring unit 30, a database management system (DBMS) 40, an environment analysis client 50, a geographical information system (GIS) 60, and an environment analysis server 70.

The base stations 20 (20-$s$, $s$=1 to Y), the communication monitoring unit 30, the database management system (DBMS) 40, the environment analysis client 50, the geographical information system (GIS) 60 and the environment analysis server 70 are connected through a network (NW) 100.

It should be noted that some or all of the communication monitoring unit 30, the database management system (DBMS) 40, the environment analysis client 50, the geographical information system (GIS) 60 and the environment analysis server 70 may be unified.

Each of the probe terminal 10 (10-$t$, $t$=1 to X) is equivalent to a communication terminal (a mobile station) in case of mobile communication, or a fixed terminal (fixed station) which has a function of the centralized monitoring and the automatic probe and which is provided on the wall of a building, a street lamp and so on. Here, the probe terminal 10 (10-$t$, $t$=1 to X) will be described as a carrying terminal such as "a portable station". The probe terminal 10-1 shows the probe terminal before a movement (hand-over). Also, the probe terminal 10-2 shows the probe terminal after the movement (hand-over). It should be noted that the movement (hand-over) of the probe terminal is not indispensable. Of course, actually, the probe terminal 10 (10-$t$, $t$=1 to X) may be "a radio station" except a portable station, and may be "the fixed station" which carries out wire communication with another station.

Each of the base stations 20 (20-$s$, $s$=1 to Y) is equivalent to a base station in the mobile communication, an access point, or a relay unit and an intermediate unit (middle box). Here, an example that the base station 20-1 is "a mobile base station" which carries out wireless communication with a mobile terminal and so on will be described. The base station 20-1 shows the base station before the movement (hand-over) of the probe terminal. Also, the base station 20-2 shows the base station after the movement (hand-over) of the probe terminal. It should be noted that the base stations 20 (20-$s$, $s$=1 to Y) may be mobile terminals (mobile stations). For example, like a communication system in an ad hook mode and so on, a case where the probe terminals carry out direct communication with each other without passing through an access point is thought of. Of course, actually, the base stations 20 (20-$s$, $s$=1 to Y) may be "radio stations" except the mobile base stations, or may be "fixed stations" which carry out wire communication with other stations.

The communication monitoring unit 30 monitors the network communications such as the mobile communication. The communication monitoring unit 30 monitors the communication of the base stations 20 (20-$s$, $s$=1 to Y) and the communication of the probe terminals 10 (10-$t$, $t$=1 to X) through the base stations 20 (20-$s$, $s$=1 to Y).

The database management system (DBMS) 40 is a server which generates a database from various data and manages and provides it.

The environment analysis client 50 is a communication terminal for a system user. It should be noted that the environment analysis client 50 may be one of the probe terminals 10 (10-$t$, $t$=1 to X).

The geographical information system (GIS) 60 is a server which manages and provides an electronic map (digital map).

The environment analysis server 70 is a server which provides a system for environment risk analysis.
(Configuration of Probe Terminal)

As shown in FIG. 1B, each of the probe terminals 10 (10-$t$, $t$=1 to X) is provided with an acquiring environment-data section 11 and an transferring environment-data section 12. The acquiring environment-data section 11 acquires environmental data such as time (time zone, date, day of week, and season), latitude and longitude of the probe terminal, direction (azimuth), reception strength (strength of electromagnetic wave), and a consumed power amount, sunshine quantity (luminosity, and light quantity), wind velocity, atmospheric pressure, temperature (heat quantity), humidity, volume, sound pressure, existence or non-existence of a barrier in its circumference, seismic intensity, geomagnetism, electromagnetic wave, radiation, and atmosphere density ($CO_x$, $NO_x$, and so on) by a timer function, a GPS (Global Positioning System) function, a sensor function, and so on. When the probe terminal is a mobile terminal (a mobile station), movement velocity and acceleration of the probe terminal may be handled as the environment data. Also, when the probe terminal is provided in water, water quality, water pressure, and a flow rate of water may be handled as the environment data. The transferring environment-data section 12 receives flag data of a data transfer trigger from the base station 20 (20-$s$, $s$=1 to Y) as a connection destination, and transfers the environment data to the database management system (DBMS) 40 through the base station 20 (20-$s$, $s$=1 to Y) according to the flag data.

It should be noted that the acquiring environment-data section 11 and the transferring environment-data section 12 are not always in an identical probe terminal. For example, the acquiring environment-data section 11 may be individually provided in each of the probe terminals as a sensor. Also, the transferring environment-data section 12 may be provided in an identical transmitter unit which is shared by the plurality of probe terminals.

(Configuration of Base Station)

Also, as shown in FIG. 1B, each of the base stations 20 (20-$s$, $s$=1 to Y) is provided with a relay function section 21, a transmitting flag-data section 22, an acquiring environment-data section 23, and an transferring environment-data section 24. The relay function section 21 has a function necessary to relay communication between the probe terminal 10 (10-$t$, $t$=1 to X) and the network (NW) 100, and transfers data of the communication to the communication monitoring unit 30. The transmitting flag-data section 22 transmits the flag data of the data transfer trigger to the probe terminals 10 (10-$t$, $t$=1 to X) and the communication monitoring unit 30. The acquiring environment-data section 23 acquires the environment data such as the time, the latitude and longitude of the probe terminal, the direction, the reception strength, the consumed power amount, the sunshine quantity, the wind velocity, the atmospheric pressure, the temperature, the humidity, the volume, the sound pressure, the existence or non-existence of the barrier, the seismic intensity, the geomagnetism, the electromagnetic wave, the radiation, and the atmosphere density by the timer function, the GPS function and the sensor function and so on. The transferring environment-data section 24 transfers the environment data to the database management system (DBMS) 40.

(Configuration of Communication Monitoring Unit)

As shown in FIG. 1C, the communication monitoring unit 30 is provided with a counting-terminal section 31, a measuring terminal-movement section 32, an acquiring section 33 for communication-related data and a transferring section 34 for communication-related data. The counting-terminal section 31 measures the number of probe terminals 10 (10-$t$, $t$=1 to X) which are accommodated by the base station 20 (20-$s$, $s$=1 to Y) as data of subscriber accommodation. The measuring terminal-movement section 32 measures the number of probe terminals 10 (10-$t$, $t$=1 to X) which have moved (handed-over) from a communication area of the base station 20-1 into a communication area of the base station 20-2 as the data of subscriber accommodation. The acquiring section 33 for communication-related data aggregates data transferred from the base stations 20 (20-$s$, $s$=1 to Y) to acquire traffic measurement data such as the time, the identification data of the base stations, the latitude and longitude of each base station, the latitude and longitude of the probe terminals, the number of accesses, and the number of times of the handover. The transferring section 34 for communication-related data receives the flag data of the data transfer trigger from the base station 20 (20-$s$, $s$=1 to Y), and transfers the traffic measurement data and the data of subscriber accommodation to the database management system (DBMS) 40 according to the flag data.

(Configuration of Database Management System (DBMS))

Figure 1D:
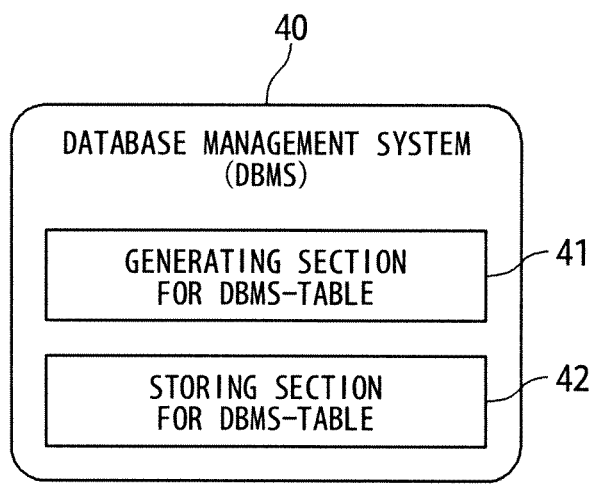
FIG. 1D is a diagram showing a configuration example of a database management system (DBMS) according to the present invention.

As shown in FIG. 1D, the database management system (DBMS) 40 is provided with a generating section 41 for DBMS-table and a storing section 42 for DBMS-table. The generating section 41 for DBMS-table generates a DBMS table based on the environment data transferred from the probe terminals 10 (10-$t$, $t$=1 to X) and the base stations 20 (20-$s$, $s$=1 to Y) and the data of subscriber accommodation transferred from the communication monitoring unit 30. The storing section 42 for DBMS-table stores the generated DBMS table.

(Configuration of Environment Analysis Client)

Figure 1E:
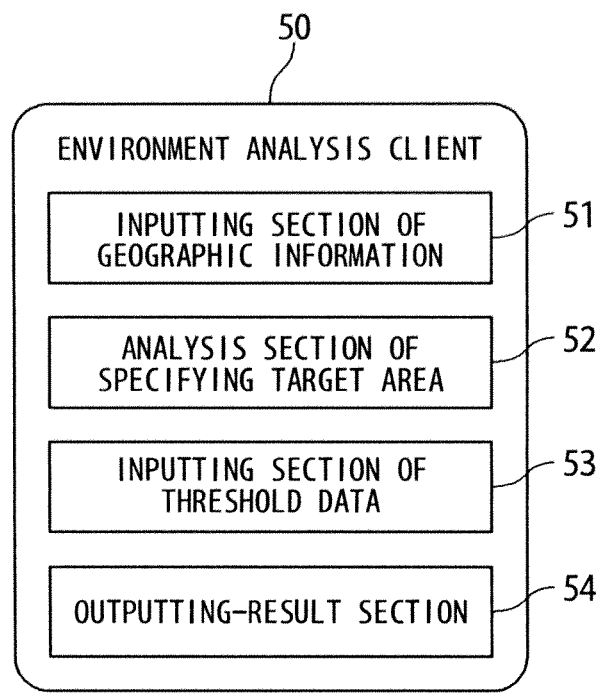
FIG. 1E is a diagram showing a configuration example of an environment analysis client according to the present invention.

As shown in FIG. 1E, the environment analysis client 50 is provided with an inputting section 51 of geographic information, an analysis section 52 of specifying target area, an inputting section 53 of threshold data and an outputting-result section 54. The inputting section 51 of geographic information receives an operation of a system user to output geographic information to the geographical information system (GIS) 60. The analysis section 52 of specifying target area receives an operation of the system user to specify an analysis-target area on the geographic information by a polygon. The inputting section 53 of threshold data receives an operation of the system user to output threshold data of an influence degree, an exposure rate, and a risk to the environment analysis server 70. When receiving the analysis results of the influence degree to environment which is based on the environment data, the exposure rate, and the risk from the environment analysis server 70, the outputting-result section 54 transfers the received data to the geographical information system (GIS) 60. Also, the outputting-result section 54 receives a layered digital map from the geographical information system (GIS) 60 and displays the digital map. It should be noted that actually, the outputting-result section 54 may generate the layered digital map based on the above-mentioned data and display it on the screen and register it on the geographical information system (GIS) 60.

(Configuration of Geographical Information System (GIS))

Figure 1F:
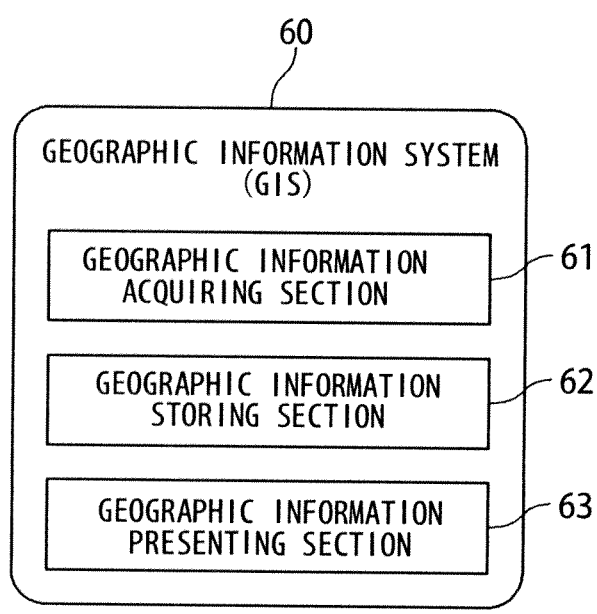
FIG. 1F is a diagram showing a configuration example of a geographical information system (GIS) according to the present invention.

As shown in FIG. 1F, the geographical information system (GIS) 60 is provided with a geographic information acquiring section 61, a geographic information storing section 62 and a geographic information presenting section 63. The geographic information acquiring section 61 acquires the digital map of an analysis-target area received from the environment analysis client 50. The geographic information storing section 62 stores the digital map in relation to the identification data of the environment analysis client 50. The geographic information presenting section 63 presents the stored digital map to the environment analysis client 50. Also, when receiving the analysis result of the influence degree to the environment, the exposure rate, the risk based on the environment data from the environment analysis client 50, the geographic information acquiring section 61 reads a corresponding digital map from the geographic information storing section 62, and overlays and layers data which is based on the analysis result, on the digital map, and stores the layered digital map in the geographic information storing section 62. At this time, the geographic information acquiring section 61 may receive the analysis results of the influence degree to the environment which is based on the environment data, the exposure rate, and the risk from the environment analysis server 70 together with the identification data of the environment analysis client 50.

(Configuration of Environment Analysis Server)

Figure 1G:
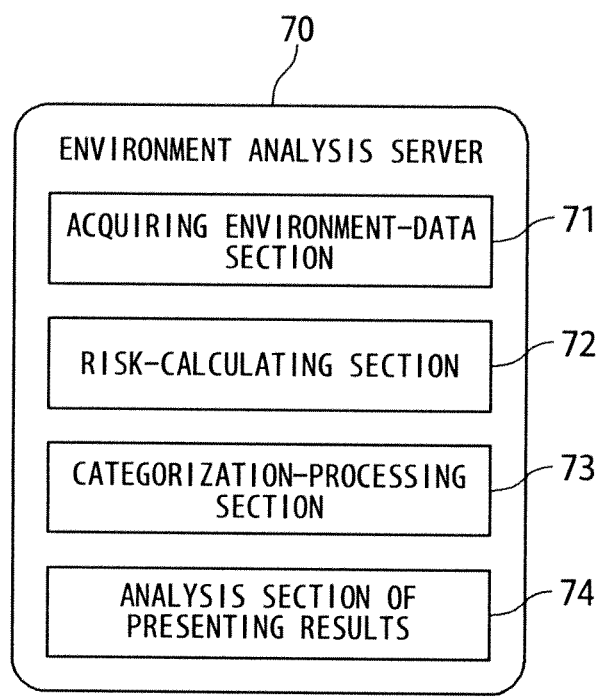
FIG. 1G is a diagram showing a configuration example of an environment analysis server according to the present invention.

As shown in FIG. 1G, the environment analysis server 70 is provided with an acquiring environment-data section 71, a risk-calculating section 72, a categorization-processing section 73 and an analysis section 74 of presenting results. The acquiring environment-data section 71 acquires the traffic measurement data and the environment data of the probe terminals 10 (10-$t$, t=1 to X) and the base stations 20 (20-$s$, s=1 to Y) from the database management system (DBMS) 40. The risk-calculating section 72 refers to the environment data and the traffic measurement data to calculate the risk from the influence degree to environment which is based on the environment data, and the exposure rate. The categorization-processing section 73 categorizes the analysis results of the influence degree, the exposure rate, and the risk based on the threshold data received from the environment analysis client 50. The analysis section 74 of presenting results transfers the categorized analysis results of the influence degree, exposure rate and risk to the environment analysis client 50. It should be noted that the analysis section 74 of presenting results may transfer the categorized analysis result of the influence degree, the exposure rate and the risk to the geographical information system (GIS) 60 together with the identification data of the environment analysis client 50.

(Exemplification of Hardware)

As an example of the probe terminals 10 (10-$t$, t=1 to X), various meters and measuring instruments, a PC (personal computer), a portable telephone, a fixation telephone (parent machine, child machine), PHS, smart phone, a smart book, a car navigation system, a door phone, an interphone, a carrying-type game machine, a home game machine, a carrying-type music player, a handy terminal, a gadget bag (electrical and electronic equipment), an Interactive TV, a digital tuner, a digital recorder, an information home appliance, an OA (Office Automation) equipment, a storefront terminal, high function copy machine, digital signage, traffic light and so on are exemplified.

As an example of the base station 20 (20-$s$, s=1 to Y), a base station of the mobile communication and an access point (AP) are exemplified. Besides, a network switch, a router, a proxy, a gateway, a firewall, a load balancer, a band control unit/security monitor, and gatekeeper, telecommunication satellite (CS), and a computer having a plurality of communication ports are exemplified.

As an example of each of the communication monitoring unit 30, the database management system (DBMS) 40, the environment analysis client 50, the geographical information system (GIS) 60 and the environment analysis server 70, a PC (personal computer), an appliance, a thin client server, a work station, a mainframe, a supercomputer and so on are exemplified. Also, in addition to computer itself, an expansion board mounted on the computer, and a virtual machine (VM) built on a physical machine are exemplified.

It should be noted that each of the probe terminal 10 (10-$t$, t=1 to X), the base station 20 (20-$s$, s=1 to Y), the communication monitoring unit 30, the database management system (the DBMS) 40, the environment analysis client 50, the geographical information system (GIS) 60 and the environment analysis server 70 may be a communication system which is possible to convey, and may be installed into the movement bodies such as a vehicle, a ship, and an aircraft.

Although not illustrated, each of the probe terminal 10 (10-$t$, t=1 to X), the base station 20 (20-$s$, s=1 to Y), the communication monitoring unit 30, the database management system (the DBMS) 40, the environment analysis client 50, the geographical information system (GIS) 60 and the environment analysis server 70 is realized by a processor which is driven based on a program to execute a type of processing, a memory which stores the program and various data, and an interface used for communication with a network.

As an example of the above-mentioned processor, a CPU (Central Processing Unit), a network processor (NP), a microprocessor, a microcontroller and a semiconductor integrated circuit (IC) which has a function in an exclusive use, and so on are exemplified.

As an example of the above-mentioned memory, semiconductor memory devices such as RAM (Random Access Memory), ROM (Read Only Memory), EEPROM (Electrically Erasable and Programmable Read Only Memory) and a flash memory, an auxiliary storage unit such as HDD (Hard Disk Drive) and SSD (Solid State Drive), removable disks such as DVD (Digital Versatile Disk), storage media such as SD memory card (Secure Digital memory card) and so on are exemplified. Also, it may be a buffer and a register. Or, it may be a storage unit which uses DAS (Direct Attached Storage), FC-SAN (Fibre Channel-Storage Area Network), NAS (Network Attached Storage), IP-SAN (IP-Storage Area Network), and so on.

It should be noted that the above-mentioned processor and memory may be unified. For example, in recent years, a device of one chip such as a microcomputer has been developed. Therefore, a case that the 1-chip microcomputer which is installed in the electrical and electronic equipment is provided as the above-mentioned processor and memory is thought of.

As an example of the above-mentioned interface, a substrate (motherboard, I/O board) corresponding to the network communication, a semiconductor integrated circuit such as a chip, network adapters and expansion cards such as NIC (Network Interface Card), communication units such as an antenna, communication ports such as connection ends (connectors) and so on are exemplified.

Also, as an example of network (NW) 100, the Internet, LAN (Local Area Network), wireless LAN (Wireless LAN), WAN (Wide Area Network), Backbone, a community antenna television system (CATV) line, a fixation telephone network, a carrying telephone network, WIMAX (IEEE 802.16a), $3^{rd}$ Generation, a lease line, IrDA (Infrared Data Association), Bluetooth (registered trademark), a serial communication line, a data bus and so on are exemplified.

Also, the internal configuration of each of the probe terminals 10 (10-$t$, t=1 to X), the base stations 20 (20-$s$, s=1 to Y), the communication monitoring unit 30, the database management system (the DBMS) 40, the environment analysis client 50, the geographical information system (GIS) 60, and the environment analysis server 70 may be a module, a component, an exclusive use device, or these start (call) programs.

However, actually, the present invention is not limited to these examples.

(Data Accumulation Processing)

Figure 2:
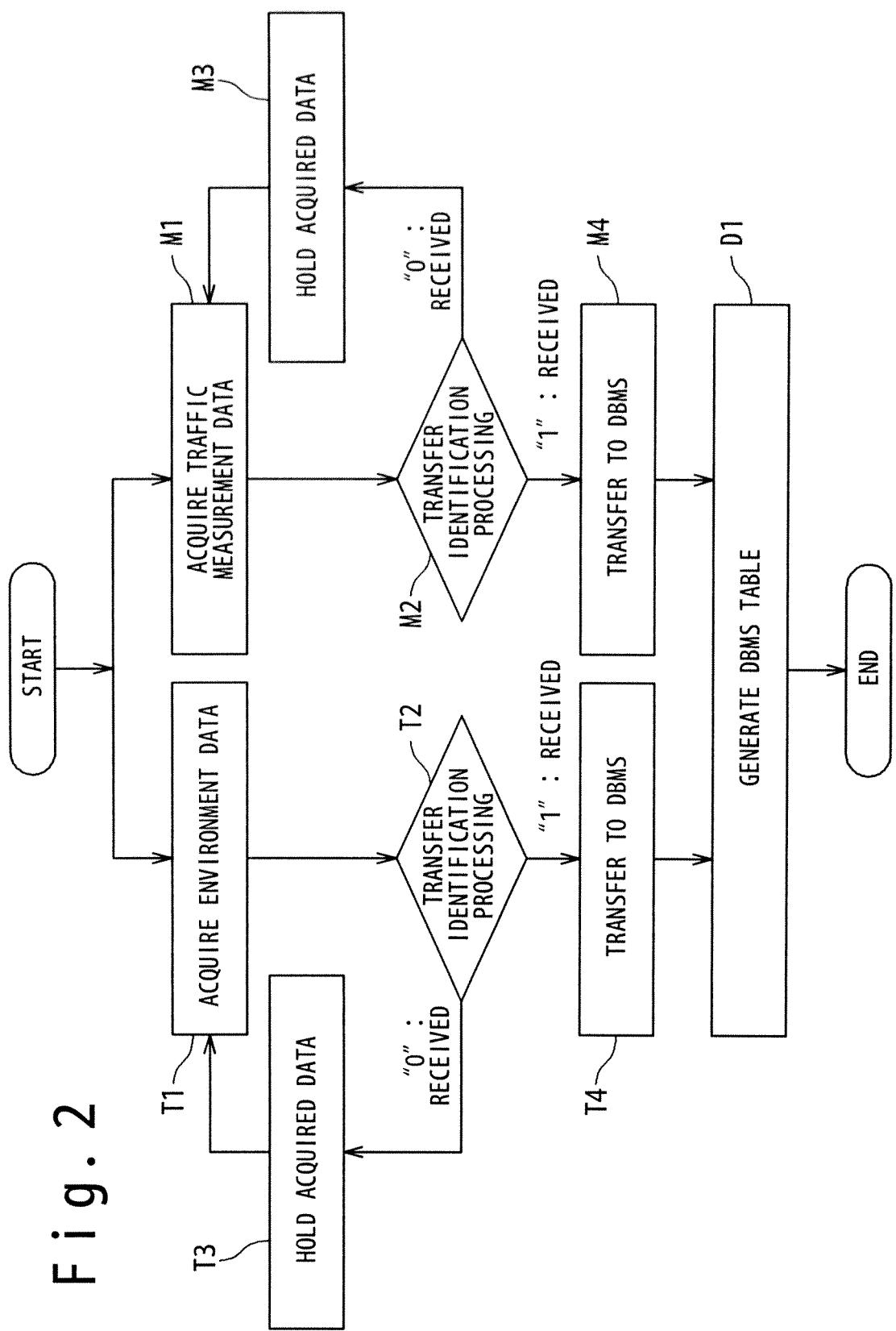
FIG. 2 is a flow chart showing data accumulation processing according to the present invention.

With reference to FIG. 2, the data accumulation processing of the present invention will be described.

(1) Step T1

The probe terminals 10 (10-$t$, t=1 to X) acquire the environment data. Here, the probe terminal 10 (10-$t$, t=1 to X) acquires the latitude and longitude data of the probe terminal by the GPS function. In a place where it is difficult to acquire the latitude and longitude data, previously set fixed data are handled as the latitude and longitude data. For example, when the probe terminal 10 (10-$t$, t=1 to X) is the fixed terminal (the fixed station), the latitude and longitude data of a building where the terminal is provided are used. When the probe terminal 10 is a mobile terminal (the mobile station), specific meaningless data such as a character string are set. Also, the probe terminal 10 (10-$t$, t=1 to X) acquires current time data by the timer function. Also, the probe terminal 10 (10-$t$, t=1 to X) acquires the environment data such as the consumed power amount, the sunshine quantity, the wind velocity, the atmospheric pressure, the temperature, the humidity, the atmosphere density and so on by the sensor function.

(2) Step T2

The probe terminal 10 (10-$t$, t=1 to X) receives the flag data of the data transfer trigger from the base station 20 (20-$s$, s=1 to Y) and carries out transfer determination processing (determination of whether or not transfer to be executed). It should be noted that the base stations 20 (20-$s$, s=1 to Y) may transmit the flag data of the data transfer trigger to the probe terminals 10 (10-$t$, t=1 to X) regularly (periodically). Or, the base station 20 (20-$s$, s=1 to Y) may transmit the flag data of the data transfer trigger to the probe terminal 10 (10-$t$, t=1 to X), when a rapid change has occurred in the communication between the probe terminal 10 (10-$t$, t=1 to X) and the network (NW) 100.

(3) Step T3

When receiving the flag data of "0" of the data transfer trigger (a flag indicating that the transfer is not executed), the probe terminal 10 (10-$t$, t=1 to X) holds the environment data. At this time, the probe terminal 10 (10-$t$, t=1 to X) returns to the step T1, and continues the processing to acquire the environment data. For example, when continuing to collect the environment data, it is possible to segment a period for which the environment data are collected, based on the timings of receiving the flag data of "0" as the data transfer trigger. It should be noted that when the environment data is retained for a longer period than a predetermined period, the probe terminals 10 (10-$t$, t=1 to X) may discard the environment data.

(4) Step T4

When receiving the flag data of "1" of the data transfer trigger (the flag indicating that the transfer should be executed), the probe terminal 10 (10-$t$, t=1 to X) transfers the environment data to the database management system (DBMS) 40 through the base station 20 (20-$s$, s=1 to Y). At this time, if there are the retained environment data, the probe terminal 10 (10-$t$, t=1 to X) may aggregate those environment data, and transfer them to the database management system (DBMS) 40. Also, the base station 20 (20-$s$, s=1 to Y) may store the environment data collected from each of the probe terminals 10 (10-$t$, t=1 to X) for a constant period, and transfer these environment data to the database management system (DBMS) 40 at a predetermined timing. Also, when the transfer of the environment data is complete, the probe terminal 10 (10-$t$, t=1 to X) transmits an instruction to the base station 20 (20-$s$, s=1 to Y) to return the flag data of the data transfer trigger to "0".

It should be noted that in the above, the acquisition and transfer of the environment data by the probe terminals 10 (10-$t$, t=1 to X) have been described. However, the acquisition and transfer of the environment data by the base stations 20 (20-$s$, s=1 to Y) are the same as those of the probe terminals 10 (10-$t$, t=1 to X). Regarding transfer identification processing by the base station 20 (20-$s$, s=1 to Y), the flag data of the data transfer trigger transmitted to the probe terminals 10 (10-$t$, t=1 to x) may be shared. In this way, by acquiring the environment data by the base stations in addition to the probe terminals, it is possible to distinguish whether the cause of the environment influence degree is based on the environment of the probe terminal or based on the environment of the base station. Also, by acquiring both of the data of the probe terminals 10 (10-$t$, t=1 to X) and the data of the base stations 20 (20-$s$, s=1 to Y), the analysis result of a high precision can be obtained, because the influence of "height", i.e. of the acquisition position of the measurement data can be more correctly grasped. Generally, the probe terminals 10 (10-$t$, t=1 to X) are provided in "the height equal to the standing height of the human being" because the human being watches the probe terminal on the ground surface. On the other hand, the base stations 20 (20-$s$, s=1 to Y) are provided in "the height" on the rooftop of a building in a top portion of a steel tower to form a wide communication service area (a cell) so as to transmit electromagnetic wave to a distant place.

(5) Step M1

The communication monitoring unit 30 aggregates the environment data transferred from the base stations 20 (20-$s$, s=1 to Y), and acquire the traffic measurement data of the time, the identification data of the base stations, the latitude and longitude data of the base stations, the latitude and longitude data of the probe terminals, the number of accesses, and the number of times of the hand-over.

(6) Step M2

The communication monitoring unit 30 receives the flag data of the data transfer trigger from the base stations 20 (20-$s$, s=1 to Y) and executes the transfer determination processing (determine whether or not the transfer should be executed). It should be noted that the base station 20 (20-$s$, s=1 to Y) may transmit the flag data of the data transfer trigger to the communication monitoring unit 30 periodically.

(7) Step M3

When receiving the flag data of "0" (the flag indicating that the transfer is not executed) as the data transfer trigger, the communication monitoring unit 30 maintains the data. At this time, the communication monitoring unit 30 returns to the step M1 and continues the processing to acquire the environment data.

(8) Step M4

When receiving the flag data of "1" (the flag indicating that the transfer should be executed) as the data transfer trigger, the communication monitoring unit 30 transfers the traffic measurement data to the database management system (DBMS) 40 upon the completion of the data transfer. At this time, if there is any environment data, the communication monitoring unit 30 may aggregate the environment data to transfer to the database management system (DBMS) 40. Also, when the transfer of the environment data is complete, the communication monitoring unit 30 transmits an instruction to the base stations 20 (20-$s$, s=1 to Y) so as to return the flag data of the data transfer trigger to "0".

(9) Step D1

The database management system (DBMS) 40 generates the DBMS table based on the environment data transferred from the probe terminals 10 (10-$t$, t=1 to X) and the traffic measurement data transferred from the communication monitoring unit 30. The DBMS table totally manages the environment data such as the time, the latitude and longitude, the reception strength, the consumed power amount, the sunshine quantity, the wind velocity, the atmospheric pressure, the temperature, the humidity, the volume, the sound pressure, with the existence or non-existence, the seismic intensity, the geomagnetism, the electromagnetic wave, the radiation, and the atmosphere density, the identification data of the base stations, and the traffic measurement data such as the number of accesses, and the number of times of the hand-over, by using the time as a primary key.

(Transmission of Flag Data as Data Transfer Trigger from Base Stations)

The reason of transmitting the flag data of the data transfer trigger from the base station 20 (20-$s$, s=1 to Y) to the probe terminals 10 (10-$t$, t=1 to X) is in that it is desirable from the viewpoint of reduction of the network load that the probe terminals 10 (10-$t$, t=1 to X) are grouped in units of base stations so that the timings at which the environment data is transferred from the probe terminals 10 (10-*t*, t=1 to X) are distributed every base station.

In this case, the environment data is periodically transferred from a specific base station group, and at this time, the environment data are not transferred from the other groups. For this purpose, the flag data of "1" is transmitted as the data transfer trigger from the base station of the specific group, and the flag data of "0" is transmitted as the data transfer trigger from the base stations of the other groups.

At this time, the reason why the flag data of "0" is transmitted as the data transfer trigger from the base stations of the other groups is in that the flag data of the data transfer trigger is transmitted from all the base stations at the same timing.

For example, when the transfer of the environment data from the specific group is stopped and the environment data is transferred from another group, the setting is changed such that the flag data of "0" of the data transfer trigger is transmitted from the base station of the specific group, and the flag data of "1" of the data transfer trigger is transmitted from the base stations of the other groups. Thus, even if the setting is changed so as to transfer the environment data from the other group, the environment data can be transferred at the same transmission timing as the transmission timing when the environment data are transferred from the specific group.

If the environment data can be always transmitted without considering the network load (without grouping), the flag data of "1" of the data transfer trigger may be simultaneously transmitted from all the base stations.

Also, the reason why the flag data of the data transfer trigger is transmitted from the base stations 20 (20-*s*, s=1 to Y) to the communication monitoring unit 30 is in that the above-mentioned function of transmitting the flag data of the data transfer trigger to the probe terminals 10 (10-*t*, t=1 to X) can be used.

(Data Input Processing)

Figure 3:
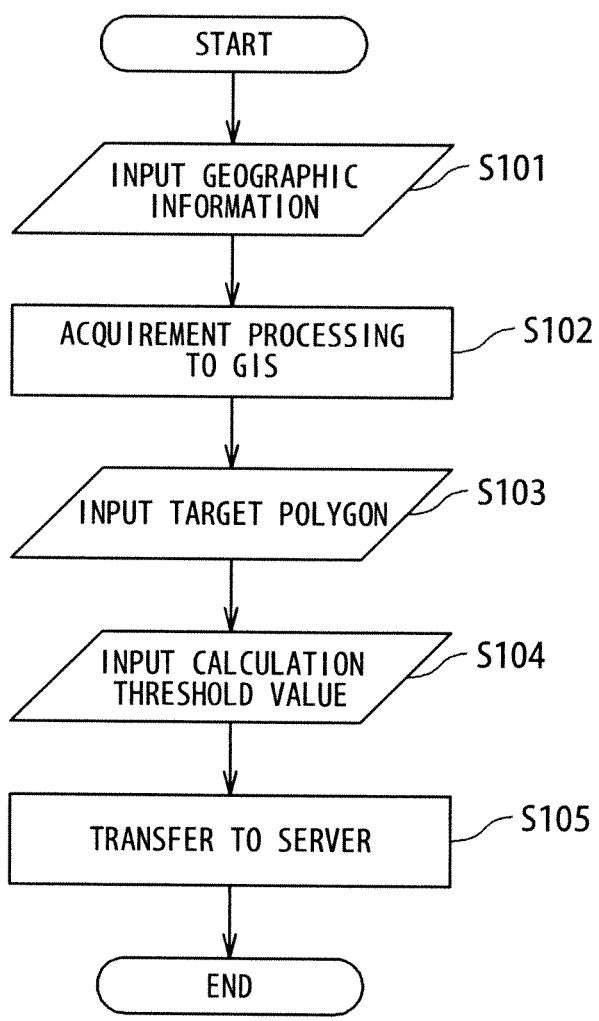
FIG. 3 is a flow chart showing data input processing according to the present invention.

With reference to FIG. 3, data input processing in the environment analysis client 50 be described.

(1) Step S101

The environment analysis client 50 outputs the geographic information to the geographical information system (GIS) 60 automatically in response to an input operation by the system user or based on setting data. Here, the environment analysis client 50 outputs commercially available geographic information as new geographic information. It should be noted that the geographic information may have any kind of the format if the geographical information system (GIS) 60 can receive it. For example, the environment analysis client 50 may generate the digital geographic information by scanning a paper-based map and output this digital geographic information to the geographical information system (GIS) 60.

(2) Step S102

The geographical information system (GIS) 60 receives the geographic information supplied from the environment analysis client 50. Here, the geographical information system (GIS) 60 receives the commercially available geographic information as the geographic information. The environment analysis client 50 displays the geographic information received by the geographical information system (GIS) 60 as a digital map in the environment risk analysis system. It should be noted that the above-mentioned processing is carried out when the geographic information which contains an analysis-target area is not yet registered on the geographical information system (GIS) 60, as a new registration of the geographic information. When the geographic information which contains the analysis-target area is already registered on the geographical information system (GIS) 60, the environment analysis client 50 reads the registered geographic information from the geographical information system (GIS) 60 and displays it as the digital geographic information of the environment risk analysis system. Thus, the environment analysis client 50 cooperates with the geographical information system (GIS) 60.

(3) Step S103

The environment analysis client 50 specifies the analysis-target area with a polygon on the digital geographic information displayed automatically based on the input operation by the system user or the setting data.

(4) Step S104

Next, the environment analysis client 50 inputs calculation threshold data used in the environment analysis server 70 automatically based on the input operation by the system user or the setting data. In this case, the environment analysis client 50 inputs the threshold data for each of kinds of the atmosphere density automatically based on the input operation by the system user or the setting data. Also, the atmosphere material for the influence calculation is selected by checking a check box and the threshold data is inputted. With the threshold data, the number of categories is set. When classifying into the L categories, the (L−1) threshold data are set. Therefore, the environment analysis client 50 inputs the threshold data of the material "j" (j=1 to M) of a target of the influence calculation as "$TH_{jk}$" (k=1 to L−1) automatically based on the input operation by the system user or the setting data. M indicates a total number of the materials for which the check boxes are checked. The L indicates a total number of classified categories. Also, for the influence exposure rate to the traffic measurement data, "$t_1$" and "$t_2$" are inputted as a start time and an end of the analysis-target, respectively.

(5) Step S105

The environment analysis client 50 transfers various data to the environment analysis server 70. When receiving the various data from the environment analysis client 50, the environment analysis server 70 determines the reception as an execution instruction of the environment analysis processing and starts the execution of the environment analysis processing.

(Environment Analysis Processing)

Figure 4:
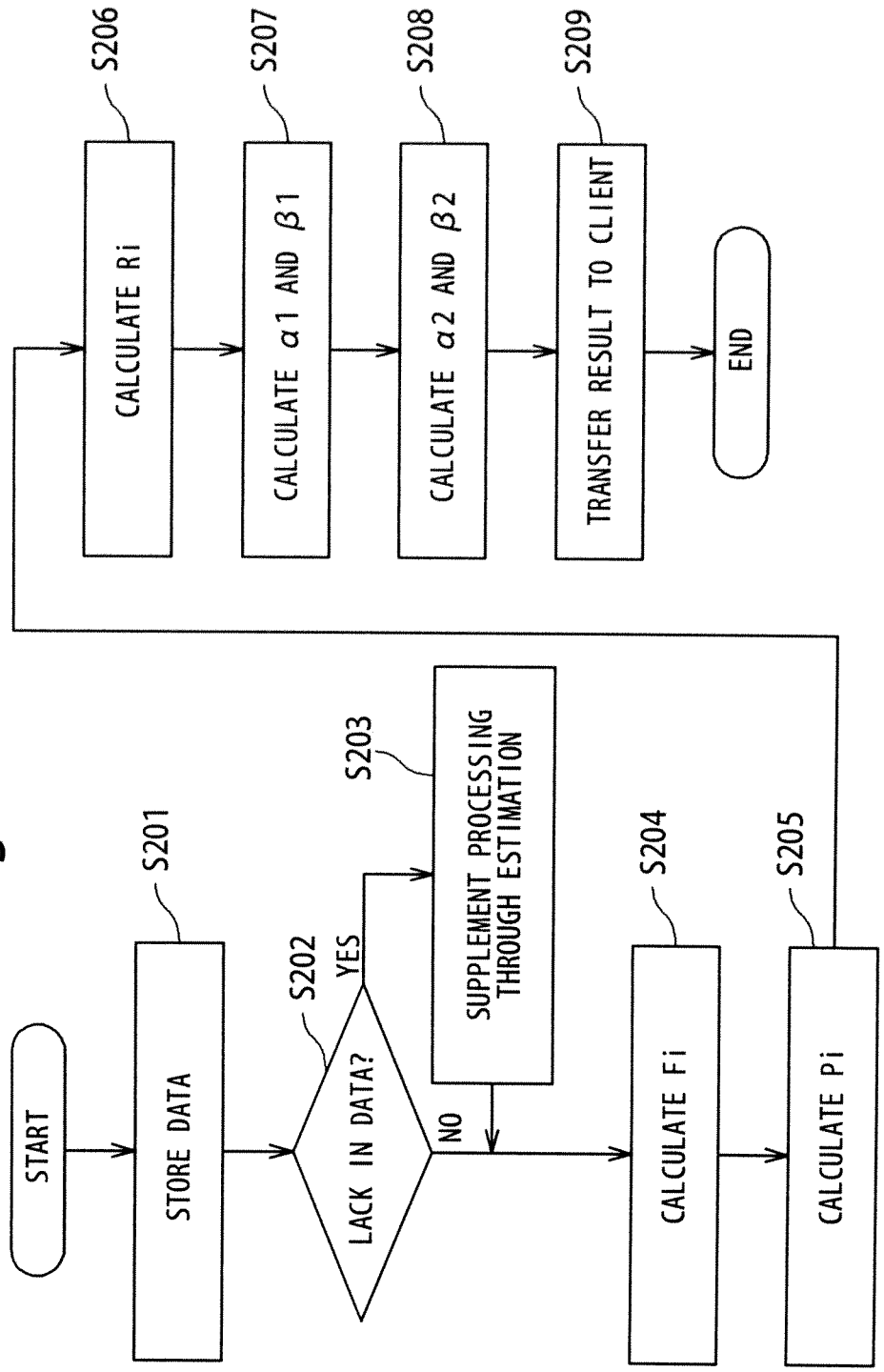
FIG. 4 is a flow chart showing environment analysis processing according to the present invention.

With reference to FIG. 4, the environment analysis processing by the environment analysis server 70 will be described.

(1) Step S201

The environment analysis server 70 refers to the database management system (DBMS) 40 based on the various data received from the environment analysis client 50, and acquires and stores data corresponding to the various data. Here, the environment analysis server 70 retains a position array of lattice points "i" of the polygon specified at the step S103 as "$G_i$" (i=1 to N). It should be noted that actually the environment analysis client 50 may generate or set the position array "$G_i$" at the step S103. N indicates a total number of lattice points "i". "$D_{ij}$" indicates the density of material "j" in the lattice point "i" of the position array "$G_i$". Also, the environment analysis server 70 refers to the DBMS table of the database management system (DBMS) 40 to set the number of accesses in the position array "$G_i$" as "$A_i$" and to set a movement quantity to "$H_i = (H_{in} - H_{out})_i$", where the number of times "$H_{in}$" of the hand-over of flowing-in subscribers and the number of times "$H_{out}$" of the hand-over of flowing-out subscribers.

(2) Step S202

The environment analysis server 70 confirms the existence or non-existence of lack data in the density "$D_{ij}$", the number "$A_i$" of accesses, and the movement quantity "$H_i$" to the position array "$G_i$".

(3) Step S203

When there is the lack data, the environment analysis server 70 complements through estimation processing. For example, the density "$D_{ij}$" can be complemented through the estimation using a diffusion equation and interpolation based on the circumference data. Also, the number "$A_i$" of accesses and the movement quantity "$H_i$" can be complemented through interpolation based on the time series data.

(4) Step S204

The environment analysis server 70 calculates an influence degree "$f_i$" by the following equations (1), (2-1), and (2-2):

$$f_i = \Sigma_{j=1}^{M} \Sigma_{k=1}^{L-1} C_{ijk} \tag{1}$$

$$C_{ijk} = k, TH_{jk-1} \leq D_{ij} \leq TH_{jk} \tag{2-1}$$

$$C_{ijk} = L, D_{ij} \geq TH_{jL-1} \tag{2-2}$$

For example, when "L=3", the threshold data is "L−1=2" and two threshold data "$TH_1$" and "$TH_2$" are set. "$C_{ijk}=1$" is met in the material "j" from the equations (2-1) and (2-2) if the density "$D_{ij}$" is equal to or greater than the threshold data "$TH_0$" and less than the threshold data "$TH_1$" ($TH_0 \cdot D_{ij} < TH_1$). Also, "$C_{ijk}=2$" is met if the density "$D_{ij}$" is equal to or greater than the threshold data "$TH_1$" and less than threshold data "$TH_2$" ($TH_1 \cdot D_{ij} < TH_2$). Also, "$C_{ijk}=3$" is met if the density "$D_{ij}$" is equal to or greater than the threshold data "$TH_2$" ($TH_2 \cdot D_{ij}$). The equation (1) means that a summation of this data is evaluated as the influence degree.

(5) Step S205

Also, the environment analysis server 70 calculates the exposure rate "$P_i$" by the following equation (3).

$$P_i = \frac{\int_{t1}^{t2} \sum_{i=1}^{N} (A_i(t) + H_i(t)) dt}{\frac{t2-t1}{24 \times 3600} \left( \sum_{i=1}^{N} (A_i(t) + H_i(t)) \right)_{ave}} \tag{3}$$

The equation (3) handles the traffic measurement data such as the number of accesses and the number of times of the hand-over from the network monitoring unit as population data which exist in the area and calculates exposure rate "$P_i$". "$\Sigma(A_i(t)+H_i(t))$" in the range of analysis-target time "t" ($t_1 \cdot t \cdot t_2$) is calculated based on the number "$A_i$" of accesses, the number "$H_{in}$" of times of the hand-over of the flowing-in subscribers, and the number "$H_{out}$" of times of hand-over of the flowing-out subscribers. Also, the average of total numbers of subscribers "$(\Sigma(A_i(t)+H_i(t)))_{ave}$" in the entire area for 24 hours is calculated and the ratio is set as the exposure rate "$P_i$".

The exposure rate is "$P_i>1$" in the area where the time zone of the analysis target is longer to the time average of the total numbers of subscribers in the entire area for 24 hours, and the influence degree "$f_i$" is large, so that the exposure rate is increased. It seems that an influence is expressed just as it is, in the area that the exposure rate is "$P_i=1$". Also, in the area that the exposure rate is "$P_i<1$", it means that the influence degree "$f_i$" becomes small in the exposure rate.

(6) Step S206

The environment analysis server 70 calculates the risk "$R_i$" ($R_i=f_i \times P_i$) of the position array "$G_i$" by a product of the influence degree "$f_i$" and the exposure rate "$P_i$". Basically, a risk is expressed as a product of the influence degree and an influence occurrence probability. For example, FMEA (Failure Mode and Effects Analysis) which is used for the failure analysis and so on is known. In the present exemplary embodiment, the one which is equivalent to the influence probability is defined as the exposure rate "$P_i$" of the influence degree.

(7) Step S207

The environment analysis server 70 expresses a relation of the consumed power amount "$E_i$" and the influence degree "$f_i$" as "$f_i = \alpha_1 E_i + \beta_1$" and calculates coefficients "$\alpha_1$" and "$\beta_1$". The client user can grasp the increase of the consumed power amount due to environment improvement technique application and an influence to the change of the atmosphere density from these coefficients. When the coefficient "$\alpha_1$" is large, the environment improvement is greatly achieved through a small reduction of the consumed power amount. Oppositely, it could be found that the environment degrades when the consumed power amount is increased slightly. When the coefficient "$\alpha_1$" is small, it could be grasped that the application of the environment technique to the consumed power amount is not too effective.

(8) Step S208

Similarly, the environment analysis server 70 expresses a relation of the number "$A_i$" of the access and the movement quantity "$H_i$" as "$H_i = \alpha_2 A_i + \beta_2$" and calculates the coefficients "$\alpha_2$" and "$\beta_2$". The client user can consider the area feature of the position array "$G_i$" that the influence clarifies, from the coefficients.

(9) Step S209

Lastly, the environment analysis server 70 transfers the obtained analysis result to the environment analysis client 50. It should be noted that actually, the environment analysis server 70 may transfer the obtained analysis result to the geographical information system (GIS) 60 with the identification data of the environment analysis client 50. Also, the environment analysis server 70 may cooperate with the environment analysis client 50 and the geographical information system (GIS) 60.

(Concept of Usage of Analysis Result)

Figure 5:
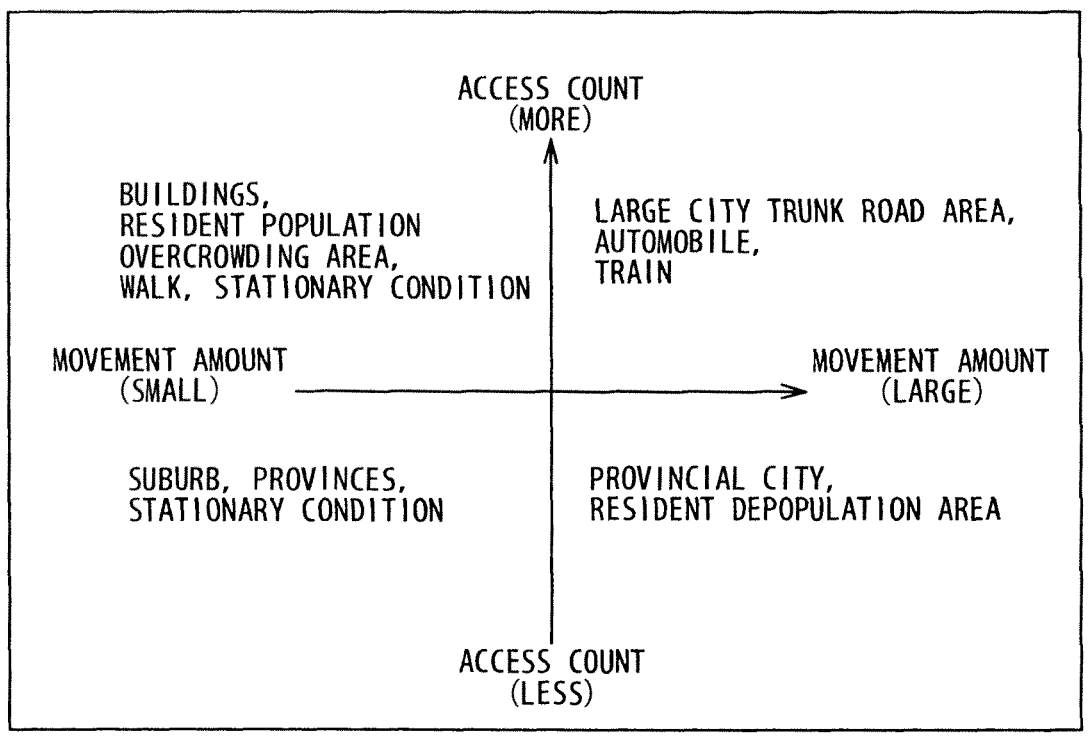
FIG. 5 shows analysis concept of characteristics area environment.

A concept of usage of the analysis result by the environment analysis server 70 is shown in FIG. 5.

In this case, a feature of the environment of the analysis-target area is displayed for each of the number of accesses and the movement quantity based on the predetermined threshold data. It should be noted that the number of accesses means the number of times the base stations 20 (20-s, s=1 to Y) are accessed from the probe terminals 10 (10-t, t=1 to X). The movement quantity means the number of times the probe terminals 10 (10-t, t=1 to X) hand-over.

As an example of the environment of a more number of accesses and more movement quantity, there is a case where the probe terminal 10 (10-t, t=1 to X) is in a "car" or a "train" of a "main road in a large city".

As an example of the environment of a less number of accesses and more movement quantity, there is a case where the probe terminal 10 (10-t, t=1 to X) is in a "depopulation area" of a "local city".

As an example of the environment of a more number of accesses and less movement quantity, there is a case where the user of the probe terminal 10 (10-t, t=1 to X) is in a "walking" or "stationary" condition in a "city building" or in an "overcrowding population area".

As an example of the environment of a less number of accesses and less movement quantity, there is a case the user of the probe terminal 10 (10-$t$, $t$=1 to X) is in the "stationary" condition in the "suburb" and the "district".

(Data Output Processing)

Figure 6:
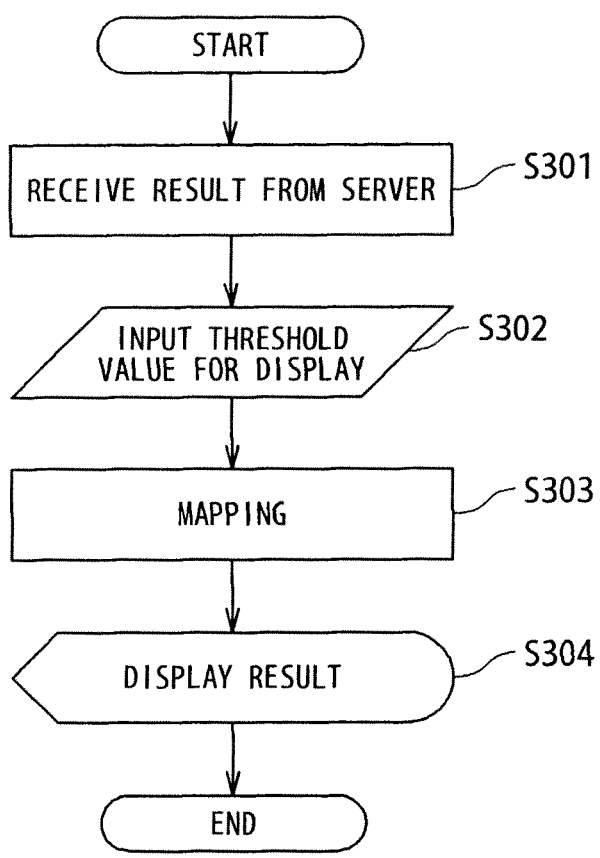
FIG. 6 is a flow chart showing the data accumulation processing according to the present invention.

With reference to FIG. 6, the data output processing by the environment analysis client 50 will be described.

(1) Step S301

The environment analysis client 50 receives a result from the environment analysis server 70.

(2) Step S302

The environment analysis client 50 inputs display threshold data automatically in response to an input operation by the system user or based on the setting data. For example, the coloring rule on a digital map is inputted such as an area of the highest risk "$R_i$" is set to red, an area of the next higher risk is set to blue, and an area of low risk is set to yellow. The similar coloring rule is inputted for the influence degree "$f_i$" and the exposure rate "Pi".

(3) Step S303

The environment analysis client 50 calls the geographic information to the position array "$G_i$" from the geographical information system (GIS) 60, identifies that it belongs to which area, according to the threshold data, and carries out the mapping of the geographic information from the geographical information system (GIS) 60 and the allocation of colors.

(4) Step S304

The environment analysis client 50 transfers the influence degree "$f_i$" calculated for the target area, the mapping result, the coefficient "$\alpha_1$", and the coefficient "$\alpha_2$" to the geographical information system (GIS) 60. The geographical information system (GIS) 60 generates and stores the layered digital map based on the information received from the environment analysis client 50, and supplies it to the environment analysis client 50 as a response. The environment analysis client 50 displays the layered digital map on the screen. It should be noted that the environment analysis client 50 may actually generate the layered digital map based on the above-mentioned information to display it on the screen and register it in the geographical information system (GIS) 60.

In this case, because the environment analysis client 50 cooperates with the geographical information system (GIS) 60, which of the environment analysis client 50 and the geographical information system (GIS) 60 may execute the above-mentioned processing. For example, the environment analysis client 50 displays only an input and an output on the screen and the geographical information system (GIS) 60 may carry out actual internal processing (generation of the layered digital map). The environment analysis client 50 ends connection and communication with the geographical information system (GIS) 60 after the display on the screen is complete and cancels the cooperation with the geographical information system (GIS) 60.

By using the traffic measurement data of the network communication, the analysis of the population dynamic change is more precise than in the conventional technique becomes possible.

Also, the risk analysis according to the ratio of the influence degree and the exposure rate becomes possible.

Also, by quantifying the feature of the area and the relation of the environment influence and the demand quantity, the environment technique can be applied based on the benefit and the sacrifice while considering the feature of the area.

IMPLEMENTATION EXAMPLES

Figure 7:
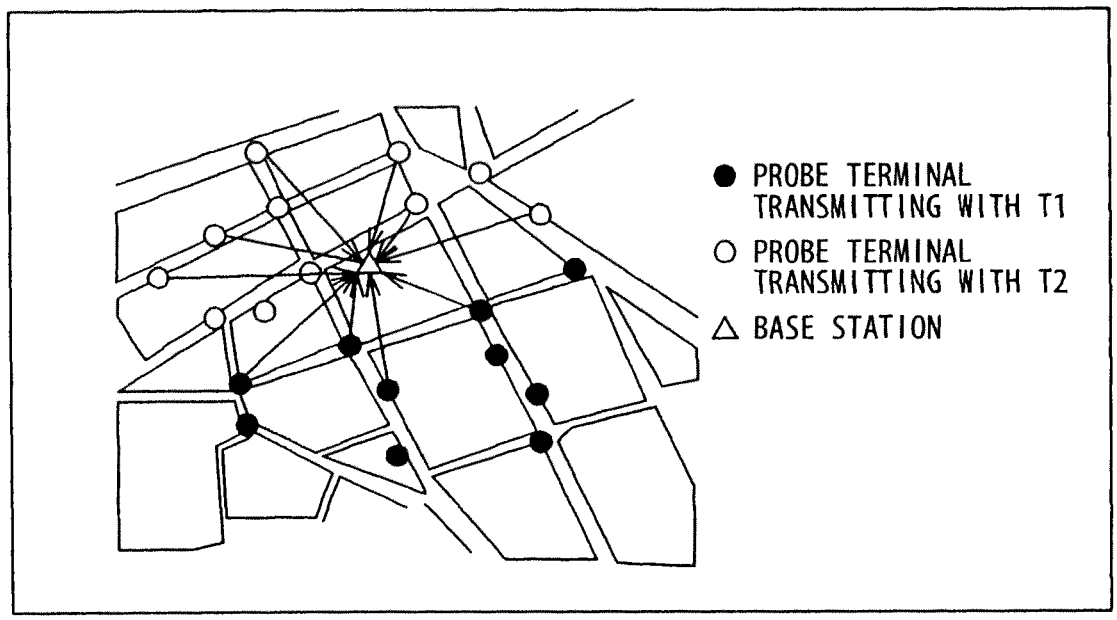
FIG. 7 is a diagram showing an implementation example of the present invention.

With reference to FIG. 7, the following three implementation examples will be described as implementation examples of the present invention.

First Implementation Example

A load distribution is carried out for the acquisition of the data.

Regarding the transfer determination processing in the data accumulation shown in FIG. 2, the timing at which the flag data are transmitted from the base station 20-1 and the base station 20-2 and the timing at which the environment data are transmitted from the probe terminal 10-1 and the probe terminals 10-2 are designed to be time "T1" when the probe terminal and the base stations are in a predetermined area, and to be time "T2" when they are in other areas.

Second Implementation Example

Noise is acquired as an environment degradation factor.

When the environment degradation factor is noise, the environment analysis server 70 carries out the analysis by replacing the influence degree "$f_i$" with sound insulation efficiency, and the consumed power amount "$E_i$" with the price of a outer wall material, in order to consider the existence or non-existence of the need which improves the sound insulation performance by the material, and outputs the coefficients "$\alpha_3$" and "$\beta_3$".

Third Implementation Example

A function of determining the environmental measure priority is added to the environment analysis client 50.

For example, based on the threshold data inputted to the environment analysis client 50 such as the value of the influence degree "$f_i$", the exposure rate "$P_i$", the risk "$R_i$", the coefficient "$\alpha_1$", and the coefficient "$\alpha_2$", the function of determining the environmental measure priority (e.g. the hierarchization decision making method) and so on are applied. The environment analysis client 50 inputs a policy of the priority and policy items. For example, the environment analysis client 50 inputs comparison evaluation data to the coefficient "$\alpha_1$", the coefficient "$\alpha_2$", and the influence degree "$f_i$" from "thinking very much" to "not thinking much at all" in 7-step scale from. Also, as the alternative, evaluation data in the 7-step scale from "very good" to "relatively bad" to policy item may be inputted. The environment analysis client 50 carries out scoring of priority based on the inputted evaluation data, and displays rank information and score information of the policy items with high priority.

(Example of Allocation Method of Lattice Point "i")

Figure 8:
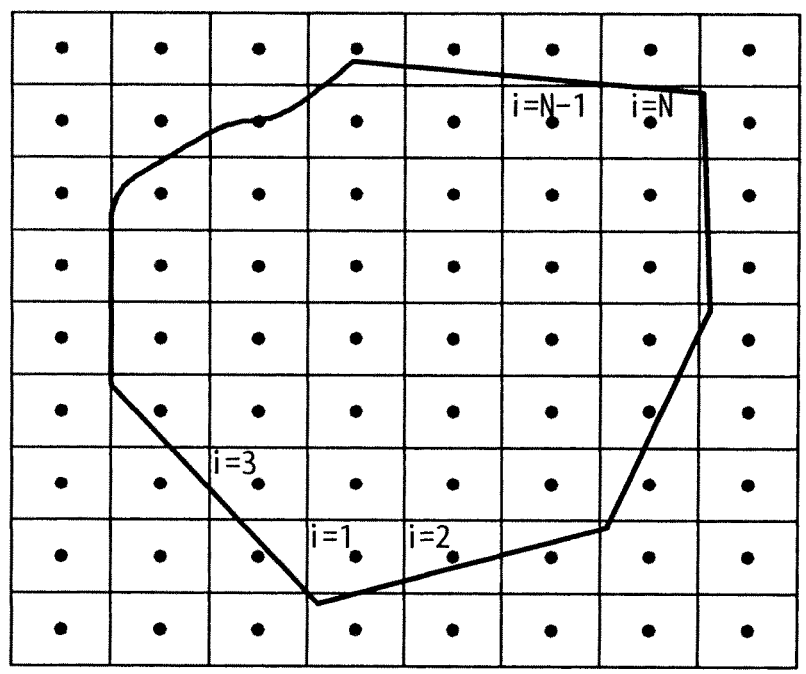
FIG. 8 is a diagram showing an allocation method of a lattice point "i" according to the present invention.

With reference to FIG. 8, an example of the allocation method of the lattice point "i" in the polygon which is specified as the analysis-target area in the geographic information will be described.

The allocation method with lattice point "i" may be a method of allocating from the left to the right (in a horizontal direction) of the digital map and from an upper point to the under point (in a vertical direction) regarding the lattice points in the polygon, and may be a method of allocating with a concentric circle radius from a central position of an image of the digital map increased in a clockwise direction. In FIG.

8, an example to allocate from the upper position to the lower position (in the vertical direction) and from the left position to the right position (in the horizontal direction) are shown in relation to the lattice points in the polygon. However, actually, the present invention is not limited to these examples.

(Example of Analysis-Target Area in Geographic Information)

Figure 9:
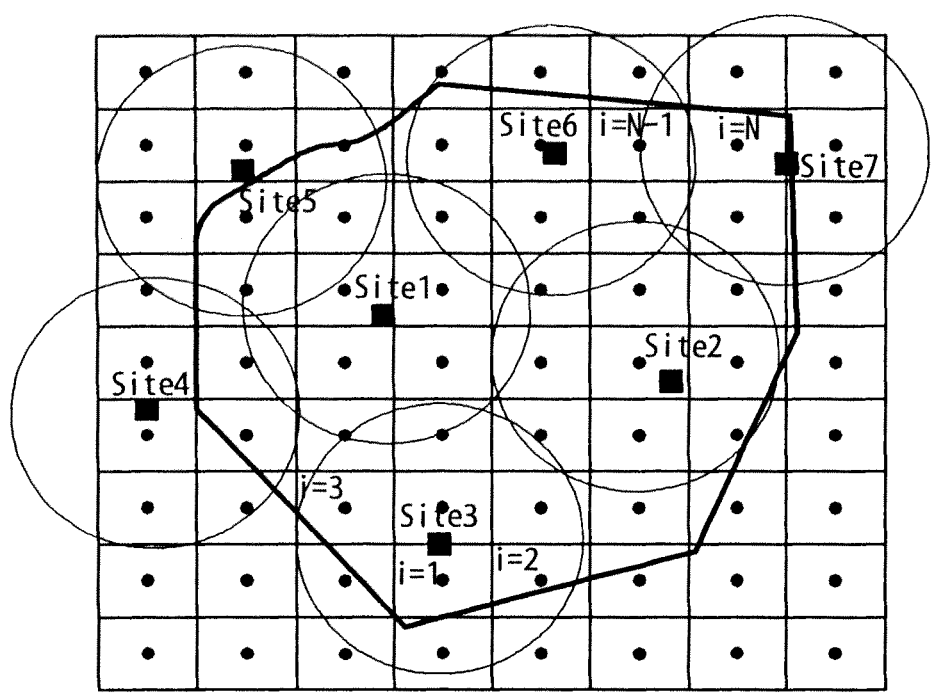
FIG. 9 is a diagram showing an analysis-target area on geographic information according to the present invention.

With reference to FIG. 9, an example of the analysis-target area in the geographic information will be described.

The communication monitoring unit 30 deals with an area surrounded or covered by the polygon as the analysis-target area, and monitors the base stations 20 (20-$s$, s=1 to Y) in this area, and receives the flag data of the data transfer trigger from the base station 20 (20-$s$, s=1 to Y) in this area. Here, the base stations 20 (20-$s$, s=1 to Y) in this area monitored by the communication monitoring unit 30 are referred to and shown as "Site1 to Site7".

It should be noted that there is a case that the communication monitoring unit 30 monitors base stations around "Site1 to Site7" with "Site1 to Site7". That is, as the base stations monitored by the communication monitoring unit 30, the base stations except "Site1 to Site7" sometimes exists. In this case, it is supposed that the communication monitoring unit 30 does not refer to the flag data of the data transfer trigger received from the base stations except "Site1 to Site7".

(Example of Data of Subscriber Accommodation)

With reference to FIG. 10, an example of data of subscriber accommodation will be described.

The data of the subscriber accommodation contains the time when data transmitted from the base stations are acquired and aggregated, the position arrangement "$G_i$" (or, the position data possible to convert into the position array "$G_i$"), the number "$A_i$" of accesses, the movement quantity "$H_i$" (the number "$H_{in}$" of times of the hand-over of the flowing-in subscribers and the number "$H_{out}$" of times of the hand-over of the flowing-out subscribers). Values equal to or more than 0 are supposed as the number "$A_i$" of accesses and the movement quantity "$H_i$". However, actually, the present invention is not limited to these examples.

<Summary>

As mentioned above, the present invention is related to a system of supporting the environment measure by carrying out risk analysis based on the environment data acquired by utilizing the function to grasp the traffic situation of the communication network. In this system, the benefit and the sacrifice for the environment influence and the consumed power amount can be considered, and the environment influence and the risk can be analyzed while grasping population dynamic change by using the traffic measurement data of the network communication.

This system is characterized in that in case of the application of the environment technique, the benefit and the sacrifice from the relation of the environment influence and the consumed power amount can be considered, while an environment risk of the area is estimated based on a product of the environment influence which is based on the environment data such as the atmosphere density and the exposure rate. Also, the precise influence grasping is possible based on the data of the subscribers of the network communication rather than the analysis of the environment influence which is implemented in the conventional transportation system.

Specifically, this system contains a communication network (communication terminals, relay units and so on), the environment analysis server, and the environment analysis client the system. This system is provided with means for estimating an environment influence, means for calculating exposure of the influence, and means for relating the consumed power amount and an influence to consider the policy convenience and the sacrifice of the environment technique.

The environment analysis server is provided with means for calculating the exposure rate of the area based on the data of subscribers to the network communication, means for estimating an environment risk in the area by the product of the environment influence which is based on the environment data such as the atmosphere density and the exposure rate, and means for determining the relation of the environment influence and the consumed power amount.

As the application for the environment business, the utilizations are thought of the present environment situation of the specific area, and for the assessment of the environment measure and the environment risk in the city planning and its design phase. Also, in case of utilization to the power business, an example which uses the present invention as the addition function of "reading power" is thought of. In future, the probe terminal may contain a sensor and a transmitter provided in or around a "home fuel cell", a "solar panel" and a "wind turbine for wind power generation (wind power generation machine)" and so on. Of course, similarly, the application to the gas business and the water supply business is possible in addition to the power business. Lastly, in the communication business, the present invention would be used as a function of the environment application system to existing communication infrastructure system.

<Remarks>

As above, the exemplary embodiments of the present invention have been described in detail. However, actually, the present invention is not limited to the above-mentioned exemplary embodiments. Various modifications are contained in the present invention in the range which does not deviate from the present invention.

What is claimed is:

1. An environment risk analysis system, comprising:
a probe terminal comprising at least one sensor, to acquire environment data including an atmosphere density;
an environment analysis client comprising a processor that executes a set of instructions to receive threshold data for analysis of an environment risk, specify an analysis-target area in geographic information, output the threshold data and data of the specified analysis-target area, receive an analysis result of the environment risk of the specified analysis-target area, and display data based on the analysis result in layers on the geographic information; and
an environment analysis server comprising a processor that executes a set of instructions to analyze the environment risk of the specified analysis-target area based on the environment data, the threshold data and the data of the specified analysis-target area, to output the analysis result,
wherein said environment analysis server calculates an estimation of a degree of an environmental influence based on the environment data, calculates an estimation of an exposure rate of the environmental influence, determines a relation between the environmental influence and a consumed power amount, and analyzes a feature of an area environment.

2. The environment risk analysis system according to claim 1, further comprising:
a base station comprising a transceiver to receive and relay environment data containing atmosphere density as a communication from said probe terminal;
a communication monitoring unit that acquires data of subscriber accommodation in said base station; and a database management system comprising a processor executing a set of instructions to collect the environment data from said probe terminal and said base station, collect the data of subscriber accommodation from said communication monitoring unit to generate a table, and provide data of said table to said environment analysis server, wherein said environment analysis server calculates the exposure rate of said specified analysis-target area based on the data of accommodation of subscribers, and estimates the environment risk in said specified analysis-target area based on a product of the environment influence degree and the exposure rate.

3. The environment risk analysis system according to claim 2, wherein said environment analysis server:

when, with respect to lattice points of the specified analysis-target area by said environment analysis client, $G_i$ is a position array of the lattice point i, $D_{ij}$ shows the atmosphere density of material j in the position array $G_i$, $A_i$ shows a number of accesses in the position array $G_i$, and a movement quantity $H_i=(H_{in}-H_{out})_i$ is determined based on a number $H_{in}$ of times of hand-over of flowing-in subscribers, and a number $H_{out}$ of times of hand-over of flowing-out subscribers, confirms whether data is lacking in the atmosphere density $D_{ij}$, the number $A_i$ of accesses, and the movement quantity $H_i$ for the position array $G_i$, complements through estimation using a diffusion equation or interpolation based on circumference data, when data is lacking in the atmosphere density $D_{ij}$, complements through the interpolation based on time series data, when data is lacking in the number $A_i$ of accesses and the movement quantity $H_i$, calculates an influence degree $f_i$ from a total of data based on a relation of the threshold data and the atmosphere density $D_{ij}$, calculates an exposure rate $P_i$ from a ratio of a total of the analysis object time zones and a time average of a total number of subscribers in all the areas for 24 hours regarding the number $A_i$ of accesses and the movement quantity $H_i$, calculates a risk $R_i$ of the position array $G_i$ from a product of the influence degree and the exposure rate $P_i$, determines coefficients $\alpha_1$ and $\beta_1$ when a reltion of a consumed power amount $E_i$ and the influence degree $f_i$ is expressed by $f_i=\alpha_1 E_i+\beta_1$, analyzes increase of the consumed power amount through application of an environment improving technique and an influence to the change of the atmosphere density based on the coefficients $\alpha_1$ and $\beta_1$, determines coefficients $\alpha_2$ and $\beta_2$ when a relation of the number $A_i$ of accesses and the movement quantity $H_i$ is expressed by $H_i=\alpha_2 A_i+\beta_2$, and analyzes a feature of the area environment of the position array $G_i$ in which the influence becomes clear, based on coefficients $\alpha_2$ and $\beta_2$.

4. An environment analysis server comprising:

means for calculating an exposure rate of a specified analysis-target area based on data of subscriber accommodation;

means for estimating an environment risk of the specified analysis-target area based on a product of the exposure rate and an environment influence degree which is based on an atmosphere density; and means for determining a relation of the environment influence degree and the consumed power amount.

5. The environment analysis server according to claim 4, further comprising:

means for determining a position array $G_i$ of a lattice point i for lattice points of the specified analysis-target area by said environment analysis client;

means for determining a density $D_{ij}$ of material j in the position array $G_i$;

means for determining the number $A_i$ of accesses in the position array $G_i$;

means for determining a movement quantity $H_i=(H_{in}-H_{out})_i$ based on a number $H_{in}$ of times of hand-over of flowing-in subscribers and a number $H_{out}$ of times of hand-over of flowing-out subscribers;

means for confirming whether data is lacking in the density $D_{ij}$, the number $A_i$ of accesses, and the movement quantity $H_i$, which are related to the position array $G_i$;

means for complementing through estimation using a diffusion equation or interpolation based on circumference data, when there is data lacking in the density $D_{ij}$;

means for complementing through the interpolation based on time series data, when there is data lacking in the number $A_i$ of accesses and the movement quantity $H_i$;

means for calculating an influence degree $f_i$ from a total of data based on a relation of the threshold data and the density $D_{ij}$;

means for calculating an exposure rate $P_i$ from a ratio of a total of analysis object time zones and a time average of a total number of subscribers of all the areas for 24 hours regarding the number $A_i$ of accesses and the movement quantity $H_i$;

means for calculating a risk $R_i$ of the position array $G_i$ from a product of the influence degree and the exposure rate $P_i$;

means for determining coefficients $\alpha_1$ and $\beta_1$ when a relation of the consumed power amount $E_i$ and the influence degree $f_i$ is expressed by $f_i=\alpha_1 E_i+\beta_1$;

means for analyzing increase of a consumed power amount through application of an environment improving technique and an influence to change of the density based on coefficients $\alpha_1$ and $\beta_1$;

means for determining coefficients $\alpha_2$ and $\beta_2$ when a relation of the number $A_i$ of accesses and the movement quantity $H_i$ is expressed by $H_i=\alpha_2 A_i+\beta_2$; and means for analyzing a feature of the area environment of the position array $G_i$ in which the influence becomes clear, based on the coefficients $\alpha_2$ and $\beta_2$.

6. A method of analyzing an environment risk, comprising:

acquiring environment data including an atmosphere density by a probe terminal;

by an environment analysis client, inputting threshold data used to analyze an environment risk, specifying an analysis-target area on geographic information, and outputting threshold data and data of the specified analysis-target area;

by an environment analysis server, estimating an environment influence degree of the specified analysis-target area based on the environment data, the threshold data and the data of the specified analysis-target area, estimating an exposure rate of the environment influence degree, calculating a relation of the environment influence degree and a consumed power amount, and analyzing a feature of area environment to output as an analysis result; and by said environment analysis client, receiving the analysis result from the environmental analysis server as comprising the environment risk of the specified analysis-target area and displaying the data which is based on the analysis result, on geographic information in layers.

7. The method of analyzing an environment risk according to claim 6, further comprising:
   acquiring the environment data containing the atmosphere density and relaying a communication of the probe terminal by a base station;
   acquiring data of subscriber accommodation in said base station by a communication monitoring unit;
   by said database management system, collecting the environment data from said probe terminal and said base station, generating a table by collecting the data of the subscriber accommodation from said communication monitoring unit, and providing data of said table to said environment analysis server; and
   by said environment analysis server, calculating the exposure rate of the specified analysis-target area based on the data of the subscriber accommodation, and estimating an environment risk of the specified analysis-target area based on a product of the exposure rate and the environment influence degree.

8. The method of analyzing an environment risk according to claim 7, further comprising:
   determining a position array $G_i$ of a lattice point i for the lattice points of a specified analysis-target area by said environment analysis client;
   determining the density $D_{ij}$ of material j in the position array $G_i$;
   determining the number $A_i$ of accesses in the position array $G_i$;
   determining a movement quantity $H_i=(H_{in}-H_{out})_i$ based on a number $H_{in}$ of times of hand-over of flowing-in subscribers and a number $H_{out}$ of times of hand-over of flowing-out subscribers;
   confirming whether data is lacking in the density $D_{ij}$, the number $A_i$ of accesses, and the movement quantity $H_i$, which are related to the position array $G_i$;
   complementing through estimation using a diffusion equation or interpolation based on the circumference data, when data is lacking in the density $D_{ij}$;
   complementing through the interpolation based on time series data, when data is lacking in the number $A_i$ of accesses and the movement quantity $H_i$;
   calculating an influence degree $f_i$ from a total of data based on a relation of the threshold data and the density $D_{ij}$;
   calculating the exposure rate $P_i$ from a ratio of a total of analysis object time zones and a time average of a total number of subscribers of all the areas for 24 hours regarding the number $A_i$ of accesses and the movement quantity $H_i$;
   calculating a risk $R_i$ of the position array $G_i$ from a product of the influence degree and the exposure rate $P_i$;
   determining coefficients $\alpha_1$ and $\beta_1$ when a relation of the consumed power amount $E_i$ and the influence degree is expressed by $f_i=\alpha_1 E_i+\beta_1$;
   analyzing increase of a consumed power amount through application of an environment improving technique and an influence to change of the atmosphere density based on coefficients $\alpha_1$ and $\beta_1$;
   determining coefficients $\alpha_2$ and $\beta_2$ when a relation of the number $A_i$ of accesses and the movement quantity $H_i$ is expressed by $H_i=\alpha_2 A_i+\beta_2$; and
   analyzing a feature of area environment of the position array $G_i$ in which the influence becomes clear, based on coefficients $\alpha_2$ and $\beta_2$.

9. A non-transitory, computer-readable storage medium tangibly embodying program code to permit a computer to execute a method which comprises:
   calculating an exposure rate of a specified analysis-target area based on data of subscriber accommodation;
   estimating an environment risk of the specified analysis-target area based on a product of the exposure rate and an environment influence degree which is based on the atmosphere density; and
   determining a relation of the environment influence degree and a consumed power amount.

10. The non-transitory computer-readable storage medium according to claim 9, wherein said method further comprises:
   determining a position array $G_i$ of a lattice point i for the lattice point of the specified analysis-target area by said environment analysis client;
   determining the density $D_{ij}$ of material j in the position array $G_i$;
   determining the number $A_i$ of accesses in the position array $G_i$;
   determining a movement quantity $H_i=(H_{in}-H_{out})_i$ based on a number $H_{in}$ of times of hand-over of flowing-in subscribers and a number $H_{out}$ of times of hand-over of flowing-out subscribers;
   confirming whether data is lacking in a density $D_{ij}$, the number $A_i$ of accesses, and the movement quantity $H_i$ which are related to the position array $G_i$;
   complementing through estimation using a diffusion equation or interpolation based on circumference data, when data is lacking in the density $D_{ij}$;
   complementing through the interpolation based on time series data, when data is lacking in the number $A_i$ of accesses and the movement quantity $H_i$;
   calculating an influence degree $f_i$ from a total of data based on a relation of threshold data and the density $D_{ij}$;
   calculating the exposure rate $P_i$ from a ratio of a total of analysis object time zones and a time average of a total number of subscribers of all the areas for 24 hours regarding the number $A_i$ of accesses and the movement quantity $H_i$;
   calculating a risk $R_i$ of the position array $G_i$ from a product of the influence degree and the exposure rate $P_i$;
   determining coefficients $\alpha_1$ and $\beta_1$ when a relation of the consumed power amount $E_i$ and the influence degree $f_i$ is expressed by $f_i=\alpha_1 E_i+\beta_1$;
   analyzing increase of a consumed power amount through application of an environment improving technique and an influence to the change of a atmosphere density based on coefficients $\alpha_1$ and $\beta_1$;
   determining coefficients $\alpha_2$ and $\beta_2$ when a relation of the number $A_i$ of accesses and the movement quantity $H_i$ is expressed by $H_i=\alpha_2 A_i+\beta_2$; and
   analyzing a feature of area environment of the position array $G_i$ in which the influence becomes clear, based on coefficients $\alpha_2$ and $\beta_2$.

* * * * *